(12) United States Patent
Zhou

(10) Patent No.: US 9,400,535 B2
(45) Date of Patent: Jul. 26, 2016

(54) POWER SUPPLY CIRCUIT FOR CENTRAL PROCESSING UNIT

(71) Applicant: ScienBiziP Consulting (Shen Zhen) Co., Ltd., Shenzhen (CN)

(72) Inventor: Hai-Qing Zhou, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 193 days.

(21) Appl. No.: 14/264,595

(22) Filed: Apr. 29, 2014

(65) Prior Publication Data

US 2015/0033041 A1   Jan. 29, 2015

(30) Foreign Application Priority Data

Jul. 26, 2013   (CN) .......................... 2013 1 0318552

(51) Int. Cl.
   *G06F 1/26* (2006.01)
   *H02M 3/158* (2006.01)
   *H02M 1/00* (2006.01)

(52) U.S. Cl.
   CPC ............... *G06F 1/26* (2013.01); *H02M 3/1584* (2013.01); *H02M 2001/0032* (2013.01); *Y02B 70/16* (2013.01)

(58) Field of Classification Search
   CPC .................. H02M 3/1584; H02M 2001/0032; Y02B 70/16
   See application file for complete search history.

(56) References Cited

U.S. PATENT DOCUMENTS

| | | | | |
|---|---|---|---|---|
| 6,804,591 | B1* | 10/2004 | Miyazawa | G06F 1/3203 307/10.1 |
| 2007/0219671 | A1* | 9/2007 | Sakurai | F02D 41/062 700/297 |
| 2009/0039843 | A1* | 2/2009 | Kudo | H02M 3/1584 323/272 |
| 2013/0124880 | A1* | 5/2013 | Luo | G06F 1/263 713/300 |

* cited by examiner

*Primary Examiner* — Chun Cao
*Assistant Examiner* — Danny Chan
(74) *Attorney, Agent, or Firm* — ScienBiziP, P.C.

(57) ABSTRACT

A power supply circuit applied to a central processing unit (CPU) of a computer includes a pulse width modulation (PWM) controller, a control circuit, a first switch circuit, a second switch circuit, a first compensation circuit, a second compensation circuit, a first power circuit, and a second power circuit. When the computer is turned on, the PWM controller regulates duty cycles of pulse signals and outputs the regulated pulse signals to the first and second power circuits according to a first compensation signal, to provide a stable voltage to the CPU. When the computer is in a standby mode, the PWM controller regulates duty cycles of pulse signals and outputs the regulated pulse signals to the first power circuit according to a second compensation signal, to provide a stable voltage to the CPU.

8 Claims, 1 Drawing Sheet

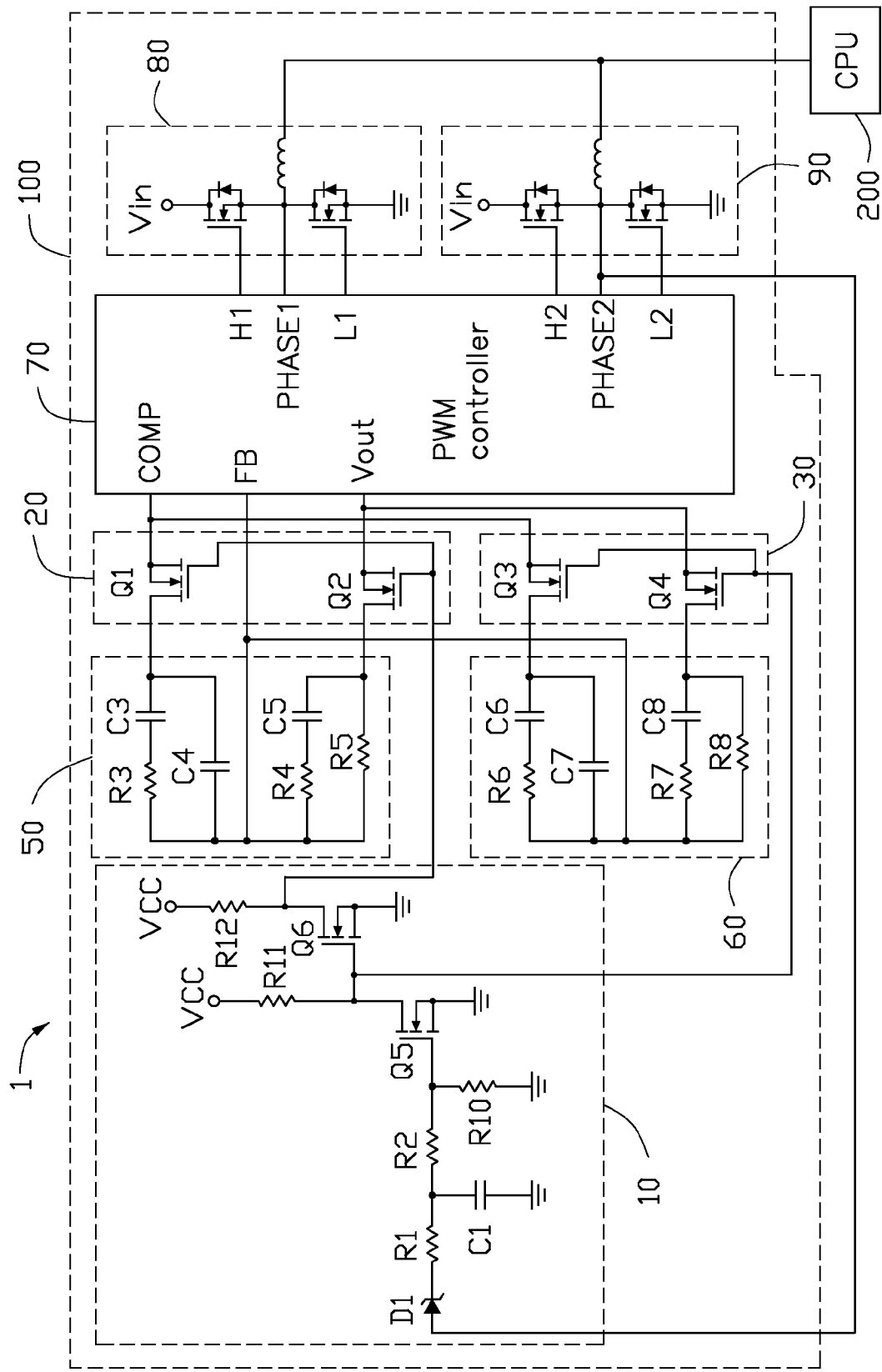

POWER SUPPLY CIRCUIT FOR CENTRAL PROCESSING UNIT

FIELD

The present disclosure relates to power supply circuits, and particularly to a power supply circuit for providing voltages to a central processing unit (CPU).

BACKGROUND

Many power circuits are arranged on a motherboard of a computer for providing voltages to a CPU. All power circuits operate when the computer is powered on, but only one power circuit operates when the computer is in a standby mode. Different combinations of power circuits provide different voltages to the CPU when the motherboard operates at different states.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the presented embodiments.

The FIGURE is a circuit diagram of an embodiment of a power supply circuit for a central processing unit of the present disclosure.

DETAILED DESCRIPTION

The disclosure, including the FIGURE, is illustrated by way of example and not by way of limitation. References to "an" or "one" embodiment in this disclosure are not necessarily to the same embodiment, and such references mean "at least one". Although discussion herein is directed to a computer, it will be understood the principles described can be utilized with other e-devices.

The FIGURE illustrates an embodiment of a power supply circuit 100 of the present disclosure. The power supply circuit 100 is arranged on a motherboard of a computer 1 to provide voltages to a CPU 200 of the computer 1. The power supply circuit 100 includes a control circuit 10, a first switch circuit 20, a second switch circuit 30, a first compensation circuit 50, a second compensation circuit 60, a pulse width modulation (PWM) controller 70, a first power circuit 80 connected to a first output terminal of the PWM controller 70, and a second power circuit 90 connected to a second output terminal of the PWM controller 70.

When the computer 1 is turned on, the first and second power circuits 80 and 90 both operate. The control circuit 10 receives a pulse signal from the PWM controller 70 and outputs a first control signal to the first switch circuit 20, and outputs a second control signal to the second switch circuit 30. The first switch circuit 20 is turned on. The second switch circuit 30 is turned off. The first compensation circuit 50 outputs a first compensation signal to the PWM controller 70 through the first switch circuit 20. The PWM controller 70 regulates duty cycle of pulse signals and outputs the regulated pulse signals to the first and second power circuits 80 and 90 according to the first compensation signal, to provide a stable voltage to the CPU 200. When the computer 1 is in a standby mode, the first power circuit 80 operates and the second power circuit 90 does not operate. The control circuit 10 does not receive a pulse signal from the PWM controller 70 and outputs a third control signal to the first switch circuit 20, and outputs a fourth control signal to the second switch circuit 30. The first switch circuit 20 is turned off. The second switch circuit 30 is turned on. The second compensation circuit 60 outputs a second compensation signal to the PWM controller 70 through the second switch circuit 30. The PWM controller 70 regulates duty cycle of a pulse signal and outputs the regulated pulse signal to the first power circuit 80 according to the second compensation signal, to provide a stable voltage to the CPU 200. In one embodiment, elements and theory of the first and second power circuits 80 and 90 are known.

The control circuit 10 includes resistors R1, R2, and R10-R12, a capacitor C1, a diode D1, and electronic switches Q5, Q6. An anode of the diode D1 is connected to the second output terminal of the PWM controller 70. A cathode of the diode D1 is connected to a first terminal of the electronic switch Q5 through the resistors R1 and R2 in series. A first end of the capacitor C1 is connected to a node between the resistors R1 and R2. A second end of the capacitor C1 is grounded. A first end of the resistor R10 is connected to a node between the resistor R2 and the first terminal of the electronic switch Q5. A second end of the resistor R10 is grounded. A second terminal of the electronic switch Q5 is connected to a power source VCC through the resistor R11. A third terminal of the electronic switch Q5 is grounded. A first terminal of the electronic switch Q6 is connected to the second terminal of the electronic switch Q5. A second terminal of the electronic switch Q6 is connected to the power source VCC through the resistor R12. A third terminal of the electronic switch Q6 is grounded. The second terminal of the electronic switch Q6 is connected to the first switch circuit 20 to output the first and third control signals. The second terminal of the electronic switch Q5 is connected to the second switch circuit 30 to output the second and fourth control signals.

The first switch circuit 20 includes electronic switches Q1, Q2. A first terminal of the electronic switch Q1 is connected to a first terminal of the electronic switch Q2 and the second terminal of the electronic switch Q6. A second terminal of the electronic switch Q1 is connected to the first compensation circuit 50. A third terminal of the electronic switch Q1 is connected to an input output (I/O) pin COMP of the PWM controller 70. A second terminal of the electronic switch Q2 is connected to the first compensation circuit 50. A third terminal of the electronic switch Q2 is connected to an I/O pin Vout of the PWM controller 70.

The second switch circuit 30 includes electronic switches Q3, Q4. A first terminal of the electronic switch Q3 is connected to a first terminal of the electronic switch Q4 and the second terminal of the electronic switch Q5. A second terminal of the electronic switch Q3 is connected to the second compensation circuit 60. A third terminal of the electronic switch Q3 is connected to the input output (I/O) pin COMP of the PWM controller 70. A second terminal of the electronic switch Q4 is connected to the second compensation circuit 60. A third terminal of the electronic switch Q4 is connected to the I/O pin Vout of the PWM controller 70.

The first compensation circuit 50 includes resistors R3-R5 and capacitors C3-C5. A first end of the capacitor C3 is connected to the second terminal of the electronic switch Q1. A second end of the capacitor C3 is connected to the second terminal of the electronic switch Q2 through the resistors R3 and R4 and the capacitor C5 in that order. A first end of the capacitor C4 is connected to the second terminal of the electronic switch Q1. A second end of the capacitor C4 is connected to a node between the resistors R3 and R4. A first end of the resistor R5 is connected to the second terminal of the electronic switch Q2. A second end of the resistor R5 is connected to the node between the resistors R3 and R4. A feedback pin FB of the PWM controller 70 is connected to the node between the resistors R3 and R4.

The second compensation circuit 60 includes resistors R6-R8 and capacitors C6-C8. A first end of the capacitor C6 is connected to the second terminal of the electronic switch Q3. A second end of the capacitor C6 is connected to the second terminal of the electronic switch Q4 through the resistors R6 and R7 and the capacitor C8 in that order. A first end of the capacitor C7 is connected to the second terminal of the electronic switch Q3. A second end of the capacitor C7 is connected to a node between the resistors R6 and R7. A first end of the resistor R8 is connected to the second terminal of the electronic switch Q4. A second end of the resistor R8 is connected to the node between the resistors R6 and R7. The feedback pin FB of the PWM controller 70 is connected to the node between the resistors R6 and R7.

In at least one embodiment, an output pin PHASE1 of the PWM controller 70 functions as the first output terminal of the PWM controller 70 and is connected to the CPU 200 through the first power circuit 80. An output pin PHASE2 of the PWM controller 70 functions as the second output terminal of the PWM controller 70 and is connected to the CPU 200 through the second power circuit 90. In at least one embodiment, resistances of the resistors R6-R8 are different from resistances of the resistors R3-R5. Capacitances of the capacitors C6-C8 are different from capacitances of the capacitors C3-05. Thus, a compensation signal of the first compensation circuit 50 is different from a compensation signal of the second compensation circuit 60.

In use, when the computer 1 is turned on, the first and second power circuits 80 and 90 operate. Thus, the PWM controller 70 outputs pulse signals to the first and second power circuits 80 and 90. The pulse signal output from the second output terminal of the PWM controller 70 is provided to the control circuit 10 and converted into a direct current (DC) voltage through the resistor R1 and the capacitor C1. The DC voltage is divided through the resistors R2 and R10 and then provided to the first terminal of the electronic switch Q5 to turn on the electronic switch Q5.

When the electronic switch Q5 is turned on, the electronic switch Q6 is turned off. The electronic switches Q1 and Q2 receive high-level signals from the electronic switch Q6 and are turned on. The electronic switches Q3 and Q4 receive low level signals from the electronic switch Q5 and are turned off. The first compensation circuit 50 outputs a first compensation signal to the PWM controller 70 through the electronic switches Q1 and Q2. The PWM controller 70 regulates duty cycles of pulse signals and outputs the regulated pulse signals to the first and second power circuits 80 and 90 according to the first compensation signal. Two field-effect transistors (FETs) of the first or second power circuits 80 and 90 are alternately turned on and turned off for charging or discharging the inductor of the first or second power circuits 80 and 90, thereby providing a stable voltage to the CPU 200.

When the computer 1 is in the standby mode, the first power circuit 80 operates while the second power circuit 90 does not operate. Thus, the PWM controller 70 only outputs a pulse signal to the first power circuit 80. The first terminal of the electronic switch Q5 does not receive a voltage and is turned off. When the electronic switch Q5 is turned off, the electronic switch Q6 is turned on. The electronic switches Q1 and Q2 receive low-level signals from the electronic switch Q6 and are turned off. The electronic switches Q3 and Q4 receive high-level signals from the electronic switch Q5 and are turned on. The second compensation circuit 60 outputs a second compensation signal to the PWM controller 70 through the electronic switches Q3 and Q4. The PWM controller 70 regulates duty cycles of pulse signals and outputs the regulated pulse signals to the first power circuit 80 according to the second compensation signal. The two FETs of the first power circuit 80 are alternately turned on and turned off for charging or discharging the inductor of the first power circuit 80, thereby providing a stable voltage to the CPU 200.

The power supply circuit 100 turns on different compensation circuits when the computer 1 works at different states. When the computer 1 is turned on, the first compensation circuit 50 outputs the first compensation signal to provide a stable voltage to the CPU 200. When the computer 1 is in the standby mode, the second compensation circuit 60 outputs the second compensation signal to provide a stable voltage to the CPU 200. Therefore, the power supply circuit 100 can output stable voltages to the CPU 200 when the computer 1 is turned on or is in the standby mode, thereby preventing the CPU 200 from being damaged.

In at least one embodiment, each of the electronic switches Q1-Q6 is an n-channel FET, and the first terminal, the second terminal, and the third terminal of each of the electronic switches Q1-Q6 are a gate, a source, and a drain of the FET, respectively. In other embodiments, each of the electronic switches Q1-Q6 can be an npn bipolar junction transistor (BJT) or other switches having similar functions.

Even though numerous characteristics and advantages of the disclosure have been set forth in the foregoing description, together with details of the structure and function of the disclosure, the disclosure is illustrative only, and changes may be made in detail, including in the matters of shape, size, and arrangement of parts within the principles of the disclosure. The embodiments disclosed herein are intended to be illustrative only and should not limit the following claims.

What is claimed is:

1. A power supply circuit applicable to a central processing unit (CPU) of a computer, the power supply circuit comprising:
   a pulse width modulation (PWM) controller comprising a first output terminal and a second output terminal;
   a first switch circuit connected to the PWM controller;
   a second switch circuit connected to the PWM controller;
   a control circuit comprising first to fifth resistors, a first capacitor, a diode, first electronic switch and second electronic switch, wherein an anode of the diode is connected to the second output terminal of the PWM controller, a cathode of the diode is connected to a first terminal of the first electronic switch through the first and the second resistors in series, a first end of the first capacitor is connected to a node between the first and the second resistors, a second end of the first capacitor is grounded, a first end of the third resistor is connected to a node between the second resistor and the first terminal of the first electronic, a second end of the third resistor is grounded, a second terminal of the first electronic switch is connected to a power source through the fourth resistor, a third terminal of the first electronic switch is ground, a first terminal of the second electronic switch is connected to the second terminal of the first electronic switch, a second terminal of the second electronic switch is connected to the power source through the fifth resistor, a third terminal of the second electronic switch is ground, the second terminal of the second electronic switch is connected to the first switch circuit to output first and third control signals, the second terminal of the first electronic switch is connected to the second switch circuit to output second and fourth control signals;

a first compensation circuit connected to the first switch circuit and the PWM controller;

a second compensation circuit connected to the second switch circuit and the PWM controller;

a first power circuit connected to the first output terminal of the PWM controller and the CPU; and a second power circuit connected to the second output terminal of the PWM controller and the CPU;

wherein when the computer is turned on, the first and second power circuits operate, the control circuit receives a pulse signal from the second output terminal of the PWM controller and output the first control signal to the first switch circuit, and the second control signal to the second switch circuit , the first switch circuit is turned on and the second switch circuit is turned off, the first compensation circuit outputs a first compensation signal to the PWM controller through the first switch circuit, the PWM controller regulates duty cycle of pulse signals and outputs the regulated pulse signals to the first and second power circuits according to the first compensation signal, to provide a stable voltage to the CPU; when the computer is in a standby mode, the first power circuit operates and the second power circuit does not operate, the control circuit does not receive a pulse signal from the PWM controller and outputs the third control signal to the first switch circuit, and the fourth control signal to the second switch circuit, the first switch circuit is turned off and the second switch circuit is turned on, the second compensation circuit outputs a second compensation signal to the PWM controller through the second switch circuit, the PWM controller regulates duty cycle of a pulse signal and outputs the regulated pulse signal to the first power circuit according to the second compensation signal, to provide a stable voltage to the CPU.

2. The power supply circuit of claim 1, wherein the first and second electronic switches are n-channel field effect transistors (FETs), the first to third terminals of the first and second electronic switches correspond to gates, sources, and drains of the FETs.

3. The power supply circuit of claim 1, wherein the first switch circuit comprises third and fourth electronic switches, a first terminal of the third electronic switch is connected to a first terminal of the fourth electronic switch and the second terminal of the first electronic switch, a second terminal of the third electronic switch is connected to a first input output (I/O) pin of the PWM controller, a third terminal of the third electronic switch is connected to the first compensation circuit, a second terminal of the fourth electronic switch is connected to a second I/O pin of the PWM controller, and a third terminal of the fourth electronic switch is connected to the first compensation circuit.

4. The power supply circuit of claim 3, wherein the second switch circuit comprises fifth to sixth electronic switches, a first terminal of the fifth electronic switch is connected to a first terminal of the sixth electronic switch and the second terminal of the first electronic switch, a second terminal of the fifth electronic switch is connected to the first I/O pin of the PWM controller, a third terminal of the fifth electronic switch is connected to the second compensation circuit, a second terminal of the sixth electronic switch is connected to the second I/O pin of the PWM controller, and a third terminal of the sixth electronic switch is connected to the second compensation circuit.

5. The power supply circuit of claim 4, wherein the first compensation circuit comprises sixth to eighth resistors and second to fourth capacitors, a first end of the second capacitor is connected to the second terminal of the third electronic switch, a second end of the second capacitor is connected to the second terminal of the fourth electronic switch through the sixth and seventh resistors and the third capacitor, a first end of the fourth capacitor is connected to the second terminal of the third electronic switch, a second end of the fourth capacitor is connected to a node between the sixth and seventh resistors, a first end of the eighth resistor is connected to the second terminal of the fourth electronic switch, a second end of the eighth resistor is connected to the node between the sixth and seventh resistors, and a feedback pin of the PWM controller is connected to the node between the sixth and seventh resistors.

6. The power supply circuit of claim 5, wherein the second compensation circuit comprises ninth to eleventh resistors and fifth to seventh capacitors, a first end of the fifth capacitor is connected to the second terminal of the fifth electronic switch, a second end of the fifth capacitor is connected to the second terminal of the sixth electronic switch through the ninth and tenth resistors and the seventh capacitor, a first end of the sixth capacitor is connected to the second terminal of the fifth electronic switch, a second end of the sixth capacitor is connected to a node between the ninth and tenth resistors, a first end of the eleventh resistor is connected to the second terminal of the sixth electronic switch, a second end of the eighth resistor is connected to the node between the ninth and tenth resistors, and a feedback pin of the PWM controller is connected to the node between the ninth and tenth resistors.

7. The power supply circuit of claim 6, wherein resistances of the ninth to eleventh resistors are different from resistances of the sixth to eighth resistors, capacitances of the fifth to seventh capacitors are different from capacitances of the second to fourth capacitors.

8. The power supply circuit of claim 6, wherein the third to sixth electronic switches are n-channel field effect transistors (FETs), the first to third terminals of the third to sixth electronic switches correspond to gates, sources, and drains of the FETs.

* * * * *